United States Patent [19]
Hodgins

[11] Patent Number: 5,793,193
[45] Date of Patent: Aug. 11, 1998

[54] DC-TO-DC CONVERTER HAVING ENHANCED CONTROL FEATURES AND ASSOCIATED METHODS

[75] Inventor: Robert G. Hodgins, Durham, N.C.

[73] Assignee: Harris Corporation, Palm Bay, Fla.

[21] Appl. No.: 799,959

[22] Filed: Feb. 14, 1997

Related U.S. Application Data

[60] Provisional application No. 60/011,712 Feb. 15, 1996.
[51] Int. Cl.⁶ ............................................. G05F 1/40
[52] U.S. Cl. .................................. 323/284; 323/285
[58] Field of Search ........................ 323/259, 283, 323/284, 285, 289, 299, 300, 278, 908; 363/78, 79, 80

[56] References Cited

U.S. PATENT DOCUMENTS

| | | | |
|---|---|---|---|
| 4,392,103 | 7/1983 | O'Sullivan et al. | 323/284 X |
| 4,994,955 | 2/1991 | Schoofs et al. | 363/95 |
| 5,043,674 | 8/1991 | Bonaccio et al. | 330/257 |
| 5,167,024 | 11/1992 | Smith et al. | 395/375 |
| 5,245,526 | 9/1993 | Balakrishnan et al. | 323/284 X |
| 5,338,987 | 8/1994 | Tomasetti et al. | 307/570 |
| 5,423,045 | 6/1995 | Kannan et al. | 395/750 |
| 5,452,434 | 9/1995 | MacDonald | 395/550 |
| 5,457,790 | 10/1995 | Iwamura et al. | 395/494 |
| 5,610,503 | 3/1997 | Fogg et al. | 323/283 |

Primary Examiner—Peter S. Wong
Assistant Examiner—Y. J. Han
Attorney, Agent, or Firm—Allen, Dyer, Doppelt, Milbrath & Gilchrist, P.A.

[57] ABSTRACT

A DC-to-DC converter includes a comparator for controlling a high-side switch and has one input connected to a switch signal and another input connected to a peak current reference signal. A comparator bias boost circuit increases a bias to the comparator to provide accurate comparisons even when the switch signal and the peak current reference signal are both relatively close to a voltage of the source. The additional bias may be provided by a voltage which is typically available for a DC-to-DC converter. More particularly, the high-side switch has a terminal defining a phase node, and the additional bias voltage may be provided by a capacitor referenced to the phase node to provide the bias higher than a voltage of the source and responsive to switching at the phase node. The converter preferably further includes one or more clamps for clamping the output of the comparator during a relatively rapid change in the bias. A clock may be used for turning on the high-side switch. The comparator may include an additional input, and the clamps may further deliver a blanking signal based upon the clock to the additional input of the comparator so that at least one of the comparator output and inputs is clamped responsive to the blanking signal. Method aspects of the invention are also disclosed.

39 Claims, 3 Drawing Sheets

DC-TO-DC CONVERTER HAVING ENHANCED CONTROL FEATURES AND ASSOCIATED METHODS

RELATED APPLICATION

This application is based upon prior filed copending provisional application Ser. No. 60/011,712 filed Feb. 15, 1996.

FIELD OF THE INVENTION

The present invention relates to the field of electronic circuits and, more particularly, to a DC-to-DC power converter having high efficiency.

BACKGROUND OF THE INVENTION

DC-to-DC power converters are widely used to supply power to electronic devices, such as in computers, printers, etc. Such DC-to-DC converters are available in a variety of configurations for producing a desired output voltage from a source voltage. For example, a buck or step down converter produces an output voltage that is less than the source voltage. A typical step down converter includes a so-called high-side switch which is pulse width modulated to connect the source voltage to an inductor to thereby power the load.

A clock signal is typically used to trigger the high-side switch. In addition, logic circuitry typically controls turn-off of the high-side switch to thereby maintain the output voltage at a desired level and without exceeding a predetermined peak output current. It is especially important for a converter that the conversion efficiency be relatively high, and that the peak current reference be accurately controlled so that the converter can be responsive to load transients.

Another difficulty with a conventional converter is that the signals that are typically compared to control the turn-off of the high-side switch may be relatively close to the supply voltage. Accordingly, such circuits may be susceptible to noise or be subject to control instability.

SUMMARY OF THE INVENTION

In view of the foregoing background, it is therefore an object of the present invention to provide a DC-to-DC converter and associated method to accurately control an output voltage.

These and other objects, features and advantages of the present invention are provided by a DC-to-DC converter including a comparator for controlling a high-side switch and having one input connected to a switch signal and another input connected to a peak current reference signal; and comparator bias boost means for increasing a bias to the comparator to provide accurate comparisons even when the switch signal and the peak current reference signal are both relatively close to a voltage of the source. Switch signal generating means is preferably connected to the high-side switch. As mentioned, the switch signal during certain operating conditions may be relatively close to a voltage of the source. The peak current signal may also be relatively small and close to the source voltage. The additional bias provided to the comparator facilitates more accurate comparisons although the input signals are relatively close to one another and the source voltage.

The additional bias may be provided by a voltage which is typically available for a DC-to-DC converter. More particularly, the high-side switch has a terminal defining a phase node, and the comparator bias boost means may be provided by a capacitor referenced to the phase node to provide the bias higher than a voltage of the source responsive to switching at the phase node.

Unfortunately, the additional bias voltage may undergo a relatively rapid change during operation. Accordingly, for this embodiment, the converter preferably further comprises clamping means for clamping at least one of the output and the inputs of the comparator during the relatively rapid change in the bias. A clock may be used along with switch turn-on control means for turning on the high-side switch responsive to the clock. The comparator may include an additional input, and the clamping means may further comprise blanking signal generating means for delivering a blanking signal based upon the clock to the additional input of the comparator so that the comparator is clamped responsive to the blanking signal.

Another aspect of the invention is that the speed of biasing may be improved. For example, the comparator may comprise a differential pair of transistors having inputs defining respective inputs of the comparator, and the converter may further include logic means for permitting the differential pair of transistors to assume a biased state to permit rapid comparison when the blanking signal changes while the comparator is clamped. In addition, or considered in slightly different terms, the comparator may further include power conserving means for powering portions of the comparator only when a comparison needs to be made.

The comparator may further include at least one current mirror connected to the differential pair of transistors. The differential pair of transistors may be bipolar and the at least one current mirror may include MOS transistors. Accordingly, the comparator bias boost means preferably comprises means for increasing the bias to the comparator to accommodate gate-to-source voltages of the MOS current mirrors and to keep the differential pair of bipolar transistors out of saturation.

A method aspect of the invention is for operating a DC-to-DC power converter for supplying power to a load from a source. The converter preferably comprises a high-side switch for supplying current to the load. The method preferably comprises the steps of: generating a switch signal related to the high-side switch; generating a current reference signal; providing a comparator having one input connected to the switch signal and another input connected to the current reference signal, the comparator having an output for controlling turn-off of the high-side switch responsive to the inputs; and increasing a bias to the comparator during comparisons.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
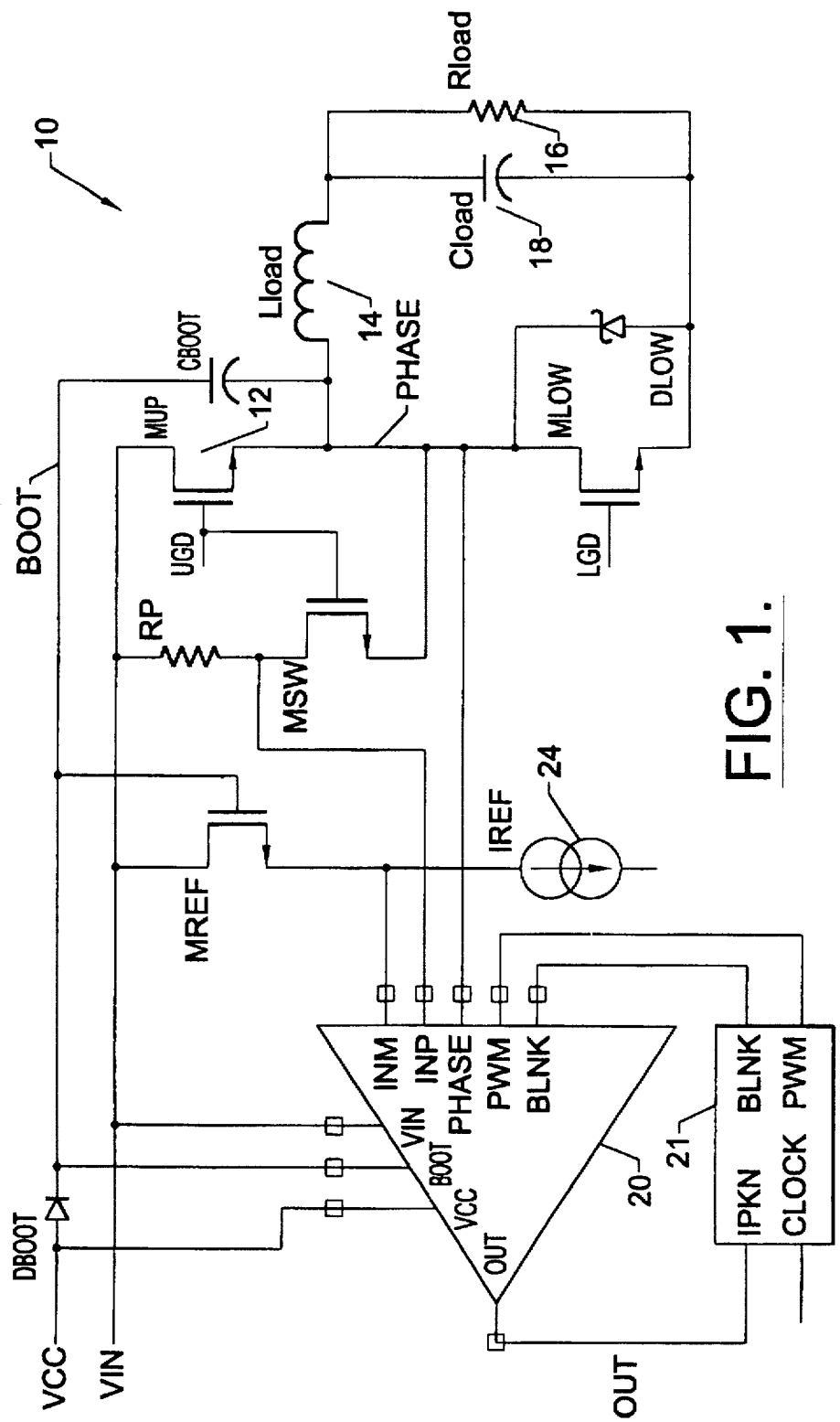
FIG. 1 is a schematic circuit diagram of a DC-to-DC converter in accordance with the present invention.

With reference to FIG. 1, a DC-to-DC converter 10 according to the invention is first described. An input voltage VIN is applied through a high-side switch (MUP) 12 to the inductor 14 to supply current to a load 16. The high-side switch 12 is operated responsive to the upper gate drive signal UGD. A capacitor 18 is conventionally applied across the load 16 to smooth the voltage across it as would be readily understood by those skilled in the art.

Those of skill in the art will also readily appreciate the operation of the lower switch device MLOW and its associated Schottky diode DLOW without further discussion. The lower switch is operated responsive to a lower gate drive signal LGD. Of course, as would also be readily understood by those skilled in the art, the lower switch may be replaced by a Schottky diode in other embodiments.

The switch 12 is turned on in response to a periodic clock and turned off in response to the action of the illustrated comparator 20 in accordance with the invention. The percentage of the total clock period for which the high-side switch 12 is on determines the average voltage across the load 16. IREF is generated by a current reference 24 and the signal is an analog of the desired peak operating current of the switch 12. IREF flowing through the reference transistor, MREF, establishes a reference voltage which is sensed by the inverting input INM of the comparator 20.

The current in the high-side switch 12 creates a small voltage across the switch 12 due to its non-zero internal resistance. This voltage is applied, through a switch transistor MSW, to the non-inverting input INP of the comparator 20. When the voltage applied to the terminal INP of the comparator 20 becomes more negative than the reference voltage applied to terminal INM of the comparator, the comparator output, OUT, switches from a high logic state to a low logic state indicating to the logic block 21 to terminate the on-time of the switch 12. This action is achieved by changing signal PWM of logic block 21 to a low state, and, thereby in a path not shown in FIG. 1, reducing the gate voltage of the switch 12 to zero volts.

When the switch 12 is turned on, the voltage of the PHASE node is nearly equal to VIN. When switch 12 is off, the voltage of PHASE node is near zero volts. With the PHASE node at zero volts, the capacitor CBOOT is charged to a voltage approximating VCC. VCC is a supply voltage for powering the control circuits including the comparator 20 and the logic block 21. When the high-side switch 12 turns on, the PHASE node goes to VIN and the BOOT node is raised to a voltage equal to VIN plus VCC due to the storage of voltage on the capacitor CBOOT.

Figure 2:
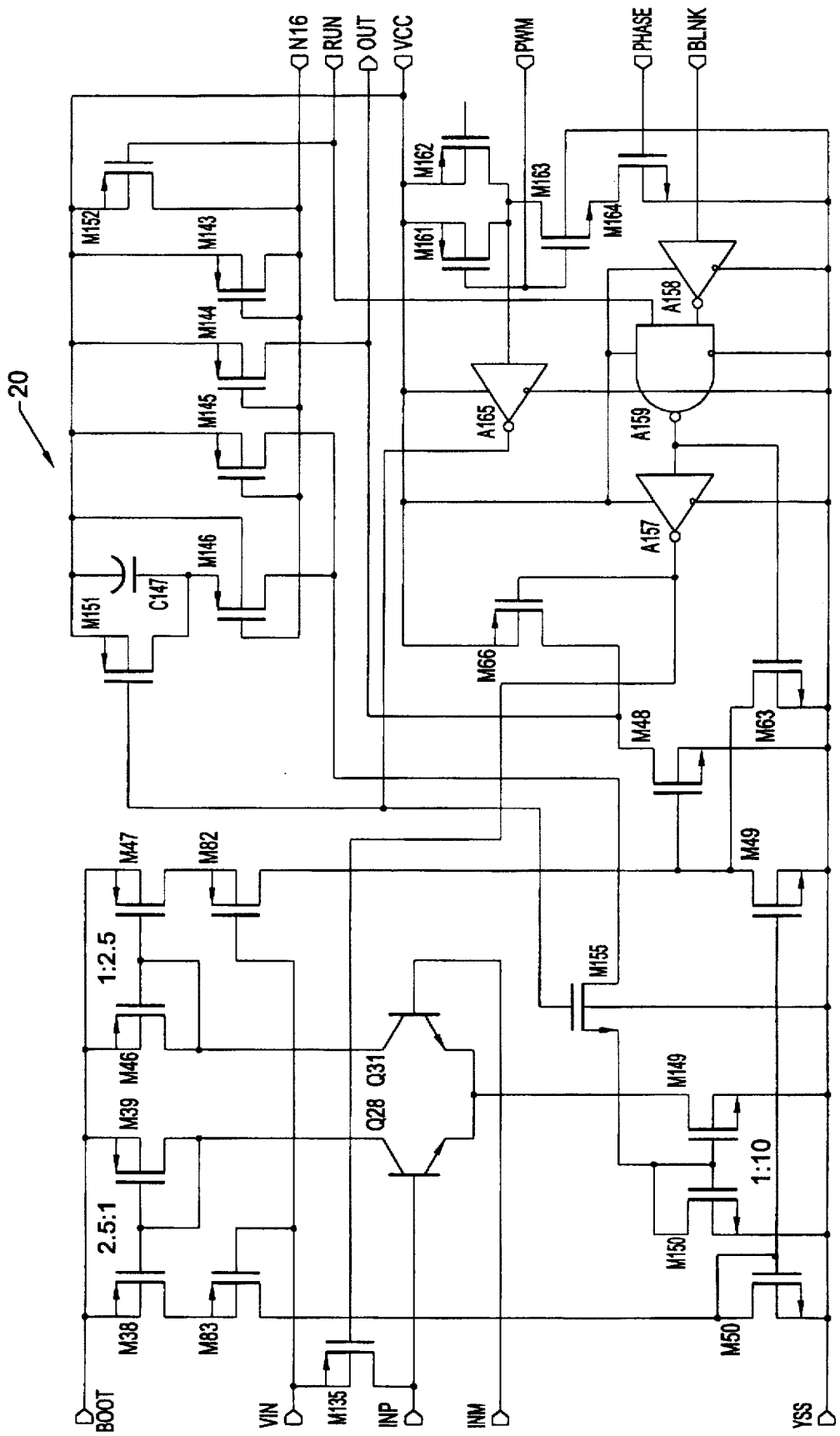
FIG. 2 is a more detailed schematic view of the comparator as shown in FIG. 1.

With additional reference to FIG. 2 where one embodiment of the comparator 20 is shown, a differential pair of transistors Q28, Q31 receive non-inverting and inverting signals INP and INM on their respective bases. The comparator's output signal OUT will go to an active low logical state when the input INP is lower in voltage than the input INN provided that the logical inputs PHASE, PWM and RUN are logical high and BLNK is a logical low. With that logical condition satisfied, the collector currents of transistors Q28, Q31 are multiplied by 2.5 in current mirrors M39, M38, M83 and M46, M47, M82, respectively.

The drain current of transistor M83 is mirrored in a 1-to-1 current mirror provided by transistors M50, M49. With the voltage at INP lower than the voltage at INM, the collector current of transistor Q31 will be greater than the collector current of transistor Q28; therefore, the drain current of transistor M82 will be greater than the drain current of transistor M49 and the voltage on the drain of transistor M49 will slew upward, thereby turning on transistor M48. The drain of transistor M48 will be forced to zero, thus bringing the output signal OUT to a logical low state.

The downward transition of the output signal OUT tells the logic block 21 (FIG. 1) to change the signal PWM to a logic low which also turns off the high-side switch 12 which, in turn, causes the PHASE node to go to ground. Transistors M161, M162, M163, M154 and inverter A165 form an AND gate which requires that both the node PHASE and PWM signals be high to enable the biasing of the differential stage. The inverter A165 output drives the gate of transistor M151, which discharges the speed-up capacitor C147, and the gate of transistor M155, which, in turn, switches the bias current fed into the current mirror provided by transistors M150, M149. The drain current of transistor M149 is the bias current for the differential pair of transistors Q28, Q31. The logic and switch transistor M155 assures that no currents flow in the differential pair and mirrors until immediately before a comparison decision needs to be made, thus saving power and improving converter efficiency.

Bias current is brought into the comparator 20 at terminal N10 from an external source. That bias current establishes a reference voltage across diode connected transistor M143. Transistors M144, M145 and M146, which have their gates connected to reference device M143, will have drain currents proportional to the current established in device M143. The current of transistor M144 is used to hold the output OUT high until it is pulled low by transistor M48. The drain currents of transistors M145 and M146 combine to form the bias applied to the differential stage.

It should be noted that when the bias current is first allowed to flow as caused by the action of the PWM and PHASE logic turning on transistor M155, the source of transistor M146 is held to voltage VCC by the discharged capacitor C147. This causes transistor M146 to initially have a high drain current which decreases to zero as capacitor C147 is charged. This action affords a turn-on boost in bias current to rapidly slew the non-biased nodes of the differential stage to their active states. If the signal RUN is at a low level, the transistor M152 will shunt the bias current of N10 away from the reference device M143 to turn off all comparator currents. The bias current supplied by transistors M145 and M146 is multiplied by 10 in the 10-to-1 current mirror defined by transistors M150 and M149. The bias current is multiplied again by 2.5 in the 2.5-to-1 current mirror provided by transistors M39, M38, M83 and M46, M47, M82. This provides a net 25-to-1 multiplication of the input bias current to afford rapid slewing of the current summing node at the drain of transistor M49.

A blanking logic signal BLNK, generated in response to the clock in the logic block 21 (FIG. 1) is applied to the comparator 20 through the terminal also labelled BLNK. This logic level will be high during and immediately following the upward transition of the PHASE node when ringing of parasitic inductances may otherwise cause false comparator readings. BLNK is inverted in the inverter A158 and combined with RUN in the NAND gate A159. The output of gate A159 drives the gate of transistor M63 such that it will be turned on whenever RUN is low or BLNK is high to thereby prevent transistor M46 from turning on to bring OUT low. Gate A159 also drives the inverter A157 which, in turn, drives the gates of transistors M66 and M135. Transistor M66 clamps OUT to VCC when BLNK is high or RUN is low. Transistor M135 clamps INP to VIN when BLNK is high or RUN is low. These clamps prevent a false low reading at the output OUT during blanking or when the comparator 20 is powered down with a low RUN signal. When RUN, PHASE, PWM and BLNK are all high, the clamp transistors M63, M66 and M135 are active, but the differential stage Q28, Q31 is permitted to assume its operating biased state to permit rapid comparison when BLNK goes low and without waiting for excess node slew times.

The input signal levels at INP and INN may be only a few millivolts below the main supply, that is, VIN. The difficult problem of making a comparison so close to the positive supply is solved with the use of the BOOT voltage in accordance with the present invention. The BOOT voltage is referenced, with a capacitor, to the switched PHASE node. When the PHASE node is switched high by the high-side switch 12, BOOT goes to a voltage several volts above VIN. By using the BOOT voltage for the source connections of transistors M38, M39, M46 and M47, sufficient voltage is available to accommodate the MOS transistor source-to-gate voltages, as well as to leave enough voltage to keep the bipolar transistors Q28 and Q31 out of saturation. This technique also permits the use of high speed, low offset bipolar transistors. Those of skill in the art will also recognize that MOS transistors could be substituted for the bipolar transistors. The clamping during blanking described above allows correct operation in spite of the use of the BOOT voltage which changes rapidly immediately before the time of comparison.

Figure 3:
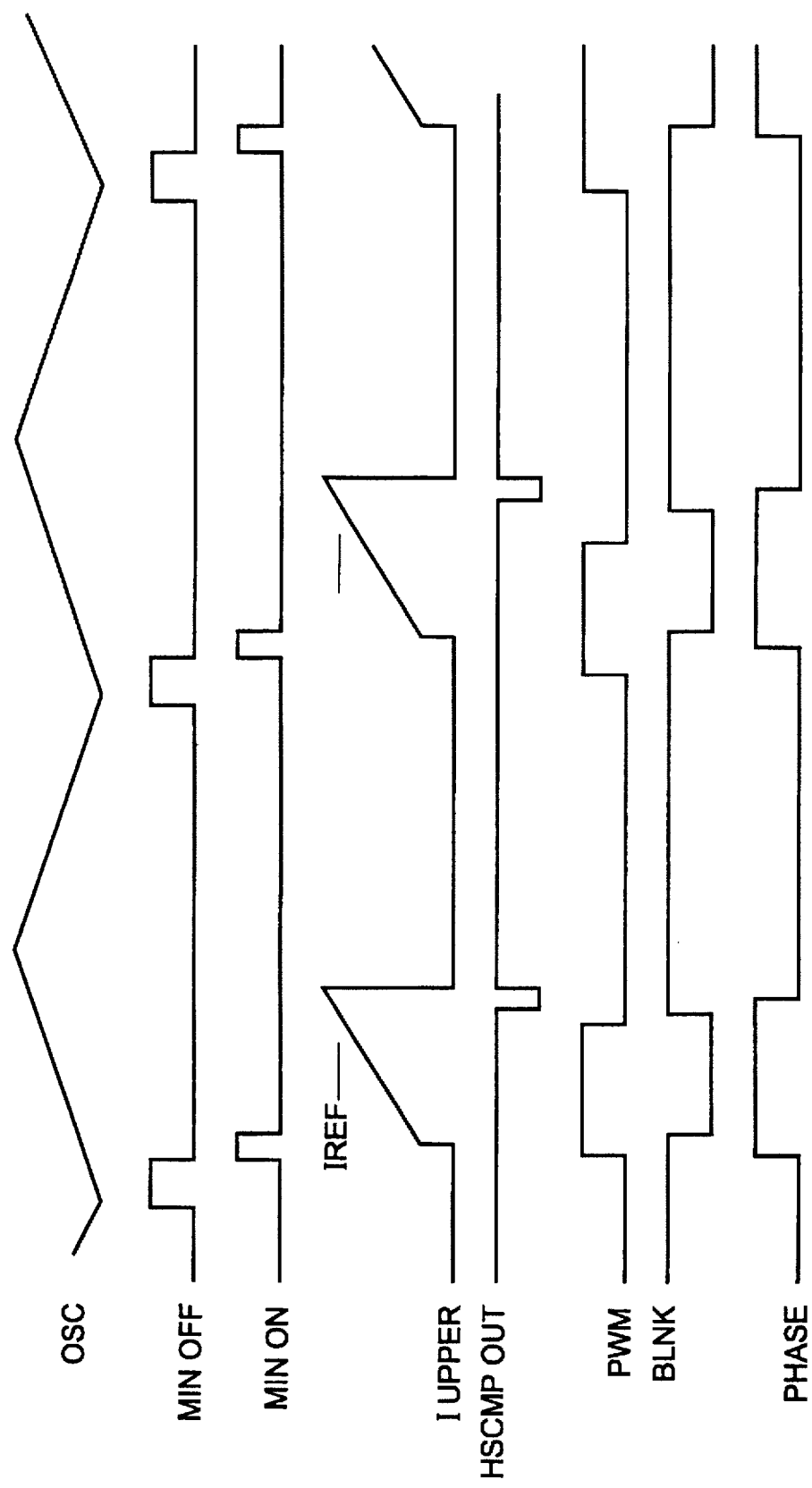
FIG. 3 is a timing diagram illustrating various signal waveforms during operation of the DC-to-DC converter in accordance with the invention.

Turning now additionally to FIG. 3 the relative timing of various signals used in the DC-to-DC converter is explained. Starting at the uppermost plot is shown the clock oscillator OSC over time. The next two waveforms are the minimum time off MIN OFF and minimum time on MIN ON waveforms. The current in the high-side switch 12 IUPPER is next plotted along with the current reference IREF. Immediately below the high-side switch current is the output waveform HSCMP of the high-side switch comparator 20. In descending order are next represented the PWM signal, the blanking signal BLNK, and the phase node voltage PHASE.

Many modifications and other embodiments of the invention will come to the mind of one skilled in the art having the benefit of the teachings presented in the foregoing descriptions and the associated drawings. For example, the DC-to-DC converter may be implemented in integrated circuit form, discrete circuit form, or a combination as would be readily understood by those skilled in the art. Therefore, it is to be understood that the invention is not to be limited to the specific embodiments disclosed, and that modifications and embodiments are intended to be included within the scope of the appended claims.

That which is claimed is:

1. A DC-to-DC power converter for supplying power to a load from a source, the converter comprising:

a high-side switch for supplying current to the load;

switch signal generating means connected to said high-side switch for generating a switch signal related to said high-side switch, the switch signal during certain operating conditions being relatively close to a voltage of the source;

switch control means for controlling said high-side switch, said switch control means comprising peak current reference signal generating means for generating a peak current reference signal related to a desired peak current, the peak current reference signal during certain operating conditions being relatively close to a voltage of the source, a comparator having one input connected to the switch signal and another input connected to the peak current reference signal, said comparator having an output for controlling turn-off of said high-side switch responsive to a comparison of the switch signal and the peak current reference signal, and comparator bias boost means connected to said comparator for increasing a bias thereto to provide accurate comparisons even when the switch signal and the peak current reference signal are both relatively close to a voltage of the source.

2. A converter according to claim 1 wherein said comparator further comprises power conserving means for powering portions of said comparator only when a comparison needs to be made.

3. A converter according to claim 1 wherein said comparator bias boost means undergoes a relatively rapid change in the bias during operation; and further comprising clamping means for clamping at least one of the output and inputs of said comparator during the relatively rapid change in the bias.

4. A converter according to claim 3 wherein said switch control means further comprises a clock and switch turn-on control means for turning on said high-side switch responsive to said clock.

5. A converter according to claim 4 wherein said comparator includes an additional input; and wherein said clamping means further comprises blanking signal generating means for delivering a blanking signal based upon said clock to the additional input of said comparator so that said comparator is clamped responsive to the blanking signal.

6. A converter according to claim 5 wherein said comparator comprises a differential pair of transistors having inputs defining respective inputs of said comparator, and wherein said switch control means further comprises logic means for permitting said differential pair of transistors to assume a biased state to permit rapid comparison when the blanking signal changes while the comparator is clamped.

7. A converter according to claim 1 wherein said high-side switch has a terminal defining a phase node; and wherein said comparator bias boost means comprises a capacitor referenced to the phase node to provide the bias higher than a voltage of the source responsive to switching at the phase node.

8. A converter according to claim 7 further comprising an inductor coupled between the phase node and the load.

9. A converter according to claim 1 wherein said comparator further comprises:

a differential pair of transistors having input terminals defining the respective inputs of said comparator; and at least one current mirror connected to said differential pair of transistors.

10. A converter according to claim 9 wherein said differential pair of transistors are a differential pair of bipolar transistors; and wherein said at least one current mirror comprises MOS transistors.

11. A comparator according to claim 10 wherein said comparator bias boost means comprises means for increasing the bias to said comparator to accommodate gate-to-source voltages of said at least one current mirror and to keep said differential pair of bipolar transistors out of saturation.

12. A converter according to claim 1 wherein said high-side switch generates a signal thereacross due to an internal resistance thereof; and wherein said switch signal generating means comprises means for generating the switch signal responsive to the signal generated across said high-side switch.

13. A DC-to-DC power converter for supplying power to a load from a source, the converter comprising:
   a high-side switch for supplying current to the load;
   switch signal generating means connected to said high-side switch for generating a switch signal related to said high-side switch;
   current reference signal generating means for generating a current reference signal related to a desired current; and
   a comparator having one input connected to the switch signal and another input connected to the current reference signal, said comparator having an output for controlling turn-off of said high-side switch responsive to a comparison of the switch signal and the current reference signal, said comparator further comprising power conserving means for powering portions of said comparator only when a comparison needs to be made.

14. A converter according to claim 13 wherein said switch control means further comprises comparator bias boost means connected to said comparator for increasing a bias thereto to provide accurate comparisons.

15. A converter according to claim 14 wherein said comparator bias boost means undergoes a relatively rapid change in the bias during operation; and further comprising clamping means for clamping at least one of the output and inputs of said comparator during the relatively rapid change in the bias.

16. A converter according to claim 15 further comprising a clock and switch turn-on control means for turning on said high-side switch responsive to said clock.

17. A converter according to claim 16 wherein said comparator includes an additional input; and wherein said clamping means further comprises blanking signal generating means for delivering a blanking signal based upon said clock to the additional input of said comparator so that said comparator is clamped responsive to the blanking signal.

18. A converter according to claim 17 wherein said comparator comprises a differential pair of transistors having inputs defining respective inputs of said comparator; and further comprising logic means for permitting said differential pair of transistors to assume a biased state to permit rapid comparison when the blanking signal changes while the comparator is clamped.

19. A converter according to claim 18 wherein said comparator further comprises:
   a differential pair of transistors having input terminals defining the respective inputs of said comparator; and
   at least one current mirror connected to said differential pair of transistors.

20. A converter according to claim 13 wherein said high-side switch generates a signal thereacross due to an internal resistance thereof; and wherein said switch signal generating means comprises means for generating the switch signal responsive to the signal generated across said high-side switch.

21. A DC-to-DC power converter for supplying power to a load from a source, the converter comprising:
   a high-side switch for supplying current to the load;
   switch signal generating means connected to said high-side switch for generating a switch signal related to said high-side switch;
   current reference signal generating means for generating a current reference signal related to a desired current;
   a comparator having one input connected to said high-side switch and another input connected to said current reference signal generating means, said comparator having an output for controlling turn-off of said high-side switch responsive to the inputs; and
   comparator bias boost means connected to said comparator for increasing a bias thereto during comparisons.

22. A converter according to claim 21 wherein said comparator bias boost means undergoes a relatively rapid change in the bias during operation; and further comprising clamping means for clamping at least one of the output and inputs of said comparator during the relatively rapid change in the bias.

23. A converter according to claim 22 further comprising a clock and switch turn-on control means for turning on said high-side switch responsive to said clock.

24. A converter according to claim 23 wherein said comparator includes an additional input; and wherein said clamping means further comprises blanking signal generating means for delivering a blanking signal based upon said clock to the additional input of said comparator so that said comparator is clamped responsive to the blanking signal.

25. A converter according to claim 24 wherein said comparator comprises a differential pair of transistors having inputs defining respective inputs of said comparator; and further comprising logic means for permitting said differential pair of transistors to assume a biased state to permit rapid comparison when the blanking signal changes while the comparator is clamped.

26. A converter according to claim 21 wherein said high-side switch has a terminal defining a phase node; and wherein said comparator bias boost means comprises a capacitor referenced to the phase node to provide the bias higher than a voltage of the source responsive to switching at the phase node.

27. A converter according to claim 21 wherein said comparator further comprises:
   a differential pair of transistors having input terminals defining the respective inputs of said comparator; and
   at least one current mirror connected to said differential pair of transistors.

28. A converter according to claim 27 wherein said differential pair of transistors are a differential pair of bipolar transistors; and wherein said at least one current mirror comprises MOS transistors.

29. A comparator according to claim 28 wherein said comparator bias boost means comprises means for increasing the bias to said comparator to accommodate gate-to-source voltages of said at least one current mirror and to keep said differential pair of bipolar transistors out of saturation.

30. A converter according to claim 21 wherein said high-side switch generates a signal thereacross due to an internal resistance thereof; and wherein said switch signal generating means comprises means for generating the switch signal responsive to the signal generated across said high-side switch.

31. A method for operating a DC-to-DC power converter for supplying power to a load from a source, the converter comprising a high-side switch for supplying current to the load, the method comprising the steps of:
   generating a switch signal related to the high-side switch;
   generating a current reference signal;
   providing a comparator having one input connected to the switch signal and another input connected to the current reference signal, the comparator having an output for controlling turn-off of the high-side switch responsive to the inputs; and increasing a bias to said comparator during comparisons.

32. A method according to claim 31 wherein the step of generating a current reference signal comprises generating a current reference signal related to a desired peak current.

33. A method according to claim 31 further comprising the step of clamping at least one of the output and inputs of the comparator during a relatively rapid change in bias.

34. A method according to claim 33 further comprising the steps of:

generating a clock signal; and turning on the high-side switch responsive to the clock signal.

35. A method according to claim 34 wherein the comparator includes an additional input; and wherein the step of clamping further comprises delivering a blanking signal based upon the clock signal to the additional input of the comparator so that the comparator is clamped responsive to the blanking signal.

36. A method according to claim 35 wherein the comparator comprises a differential pair of transistors having inputs defining respective inputs of the comparator; and further comprising the step of permitting the differential pair of transistors to assume a biased state to permit rapid comparison when the blanking signal changes while the comparator is clamped.

37. A method according to claim 31 wherein the high-side switch has a terminal defining a phase node; and wherein the step of increasing a bias comprises referencing a capacitor to the phase node and connecting the capacitor to the comparator to provide the bias higher than a voltage of the source responsive to switching at the phase node.

38. A method according to claim 31 wherein the comparator further comprises a differential pair of bipolar transistors having input terminals defining the respective inputs of said comparator, and at least one current MOS mirror connected to said differential pair of transistors; and wherein the step of increasing the bias comprises increasing the bias to the comparator to accommodate gate-to-source voltages of the at least one current mirror and to keep the differential pair of bipolar transistors out of saturation.

39. A method according to claim 31 wherein the step of generating the switch signal comprises generating same based upon an internal resistance across terminals of the high-side switch.

* * * * *